(12) United States Patent
Hayashi

(10) Patent No.: US 7,035,507 B2
(45) Date of Patent: Apr. 25, 2006

(54) MANUFACTURING METHOD FOR OPTICAL ELEMENT

(75) Inventor: Kenichi Hayashi, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 194 days.

(21) Appl. No.: 10/749,098

(22) Filed: Dec. 30, 2003

(65) Prior Publication Data

US 2004/0190152 A1    Sep. 30, 2004

(30) Foreign Application Priority Data

Jan. 10, 2003   (JP)   ............................ 2003-003781

(51) Int. Cl.
- G02B 6/26    (2006.01)
- G02B 6/34    (2006.01)
- G11B 7/26    (2006.01)
- G11B 7/24    (2006.01)

(52) U.S. Cl. ...................... 385/37; 285/147; 369/275.1; 369/275.4; 438/42; 82/1.4; 700/193

(58) Field of Classification Search ................... 82/1.4; 385/37, 147; 369/275.1, 275.4
See application file for complete search history.

(56) References Cited

U.S. PATENT DOCUMENTS

| | | | | |
|---|---|---|---|---|
| 3,719,462 A | * | 3/1973 | Andreatch et al. ............ | 65/30.1 |
| 5,396,434 A | * | 3/1995 | Oyama et al. ............... | 700/193 |
| 5,448,551 A | * | 9/1995 | Miyagawa et al. ....... | 369/275.1 |
| 5,713,253 A | * | 2/1998 | Date et al. .................... | 82/1.11 |
| 5,740,081 A | * | 4/1998 | Suzuki ........................ | 702/94 |
| 6,301,520 B1 | * | 10/2001 | Hayashi ...................... | 700/193 |
| 6,486,965 B1 | * | 11/2002 | Kim ............................ | 356/626 |
| 2001/0030937 A1 | * | 10/2001 | Sakamoto et al. .......... | 369/277 |
| 2002/0093906 A1 | * | 7/2002 | Deno et al. ............. | 369/275.1 |
| 2003/0053407 A1 | * | 3/2003 | Hirokane et al. ......... | 369/275.4 |
| 2005/0181527 A1 | * | 8/2005 | Ohno et al. ................... | 438/33 |

FOREIGN PATENT DOCUMENTS

| | | | |
|---|---|---|---|
| JP | 02297732 A | * | 12/1990 |
| JP | 07006412 A | * | 1/1995 |

* cited by examiner

Primary Examiner—Michelle Connelly-Cushwa
(74) Attorney, Agent, or Firm—Hogan & Hartson, L.L.P.

(57) ABSTRACT

A manufacturing method for an optical element includes providing a base member for an optical element and a cutting tool from which a blade tip part protrudes, forming an inspecting groove on a surface of the base member by the blade tip part of the cutting tool by relatively moving the cutting tool and the base member while the cutting tool is rotated and inspecting an inclination of a cut surface of the inspection groove formed by the cutting tool to form an inspection result. The method also includes correcting an angle defined by the base member and the blade tip part of the cutting tool based on the inspection result and forming formal grooves on the surface of the base member having the inspection groove by the blade tip part of the cutting tool by relatively moving the cutting tool and the base member while the cutting tool is rotated simultaneously with the inspection groove being cut out.

14 Claims, 5 Drawing Sheets

MANUFACTURING METHOD FOR OPTICAL ELEMENT

BACKGROUND OF THE INVENTION

1. Field of the Invention

The present invention relates to a manufacturing method for an optical element such as a diffraction element, which is provided with minute grooves.

2. Description of Related Art

A diffraction element which is used in an optical head device to record onto or reproduce from a CD, a CD-R or a DVD is provided with many fine or minute grooves formed at a prescribed pitch on the surface of a base member of an optical element. The minute grooves cannot be formed by a conventional working machine with a degree of working accuracy of 0.1 μm. Therefore, the diffraction element is conventionally manufactured by using semiconductor processes.

However, the manufacturing costs are high when the semiconductor processes are used as the manufacturing method for the optical element. Further, in order to form the minute grooves having a protruded part and a recessed part by the semiconductor processes, a mask layer is formed by utilizing a photo lithography technique and etchings are performed on the base member through apertures of the mask layer. Using these techniques, slant faces cannot be formed. Accordingly, in recent years, it has been considered to form the minute grooves on a diffraction element by using an ultra-precision working machine whose resolution power is 1 nm.

However, even though the ultra-precision working machine is used, when the groove is machined, a high degree of precision is not attained for the inclination of the bottom part of the recessed part or the upper part of the protruded part, which form the minute grooves. The degree of precision of the inclination is ±1° at most. The low precision causes the variation of the height differences between right and left side faces of the groove. As a result, the diffracted beams with a first or more order, which are to be diffracted symmetrically, will not have equal diffracted efficiency unfavorably. For example, the diffracted efficiencies of a (+) first-order diffracted beam and a (−) first-order diffracted beam are not equal to each other.

In other words, in the conventional machine working, all errors, that is, an error caused by the machining precision of the working machine itself, an error caused by the configuration of a tool, a mounting error of the tool to the working machine, an error caused by the configuration of the base member to be machined, and a mounting error of the base member to the working machine, are summed up and cause inclination errors of the bottom surface of a recessed part or the upper surface of a protruded part which forms the groove.

SUMMARY OF THE INVENTION

In view of the problems described above, it is an advantage of the present invention to provide a manufacturing method for an optical element, which can manufacture the optical element provided with minute grooves having a high degree of precision of its configuration and dimension by using a mechanical processing at a low cost.

In order to achieve the above advantage, according to the present invention, there is provided a manufacturing method for an optical element including providing a base member for an optical element and a cutting tool from which a blade tip part is protruded, forming an inspection groove on the surface of the base member by the blade tip part of the cutting tool by means of relatively moving the cutting tool and the base member while the cutting tool is rotated (inspection groove forming step), and inspecting the inclination of a cut surface of the inspection groove formed by the cutting tool (inspection step). The method also includes correcting the angle defined by the base member and the blade tip part of the cutting tool on the basis of the inspection result (correction step), and forming formal grooves on the surface of the base member formed with the inspection groove by the blade tip part of the cutting tool by means of relatively moving the cutting tool and the base member at the same time that the inspection groove is cut out (finishing step).

In accordance with an embodiment of the present invention, an inspection groove or inspection grooves are formed in advance (inspection groove forming step) on the surface of the base member by the cutting tool. Then, the inclination or the inclinations of the cut surfaces of the inspection grooves, which is constituted, for example, of a recessed part and a protruded part, is inspected (inspection step). After that, on the basis of the inspection result, the angle defined by the base member and the cutting tool is corrected, in other words, the angle defined by the reference surface of the base member and the lower end part (edge line) of the blade tip part of the cutting tool is corrected (correction step). Then, final and formal prescribed minute grooves are formed on the surface of the base member provided with the inspection grooves by the same cutting tool while cutting out the portion including the inspection grooves (finishing step).

Therefore, the error caused by the configuration of the cutting tool, the mounting error of the cutting tool to the working machine, the error caused by the configuration of the base member, and the mounting error of the base member to the working machine do not affect the inclinations of the bottom surface of the recessed part and the upper surface of the protruded part which form the final and formal prescribed grooves. Consequently, according to the embodiment of the present invention, the optical element provided with the grooves having a high degree of precision relating to the configuration and the dimension can be formed by the mechanical processing at a low cost.

In accordance with an embodiment of the present invention, the width dimension D of the blade tip part is preferably slightly wider than half (½) of the pitch (W1+W2) of the formal groove, wherein one interval (W1+W2) of the recessed part having a width dimension W1 and the protruded part having a width dimension W2 is one pitch of the formal groove. In the case that the width dimension D of the blade tip part is formed narrower than the half (½) of the pitch (W1+W2) of the groove, at least one of the recessed part and the protruded part is required to perform cutting two times or a plurality of times. However, when the width dimension D of the blade tip part is slightly wider than the half (½) of the pitch (W1+W2) of the groove, both the recessed part and the protruded part can be formed by executing the cutting only once.

Preferably, in accordance with an embodiment of the present invention, the width dimension D of the blade tip part of the cutting tool is set to be equal to the width dimension W1 of the recessed part and slightly wider than the width dimension W2 of the protruded part. In this case, when the cutting tool is shifted by half ((W1+W2)/2) of the pitch (W1+W2) of the groove in the widthwise direction of the groove and the recessed and protruded parts are machined, the blade tip part of the cutting tool cuts the protruded part so as to cover the edge portion of the recessed part and the protruded part. Thus, the edge portions formed between the recessed part and the protruded part can be formed properly and the protruded part is also formed by machining only one time with a high degree of precision. The processes that the cutting tool is shifted by half ((W1+W2)/2) of the pitch (W1+W2) of the groove in the widthwise direction of the groove and then the recessed part or the protruded part is machined are repeated to form the formal grooves constituted of the recessed part and the protruded part alternately.

In accordance with an embodiment of the present invention, the angles (corner angle), which are defined by the edge line extended along the widthwise direction at the lower end edge of the blade tip part and the side faces of the blade tip part, may be substantially equal to each other and may be set between 90° (included) and 120°(included).

Preferably, in accordance with an embodiment of the present invention, the angle that is defined by the base member and the edge line of the blade tip part of the cutting tool is corrected to be 0±0.02° or less with respect to a prescribed designed angle for the groove in the correction step. According to the optical element manufactured by the method described above, the precision of the configuration and the dimension of the groove can be enhanced to be high, and thus the deviation of the balance of the diffracted light beams with a first- or more order can be suppressed within ±3%. For example, the deviation of the balance of the (+) first-order diffracted light beam and the (−) first-order diffracted light beam can be suppressed within ±3%.

In order to achieve the above advantage, according to another present invention, there is provided a manufacturing method for an optical element including providing a base member for a molding die for an optical element and a cutting tool from which a blade tip part is protruded, forming an inspection groove on the surface of the base member by the blade tip part of the cutting tool by means of relatively moving the cutting tool and the base member while the cutting tool is rotated (inspection groove forming step), and inspecting the inclination of a cut surface of the inspection groove formed by the cutting tool (inspection step). The method also includes correcting the angle defined by the base member and the blade tip part of the cutting tool on the basis of the inspection result (correction step), forming formal grooves on the surface of the base member of the molding die formed with the inspection groove by the cutting tool by means of relatively moving the cutting tool and the base member at the same time that the inspection groove is cut out (finishing step), and manufacturing an optical element by using the molding die with the formal grooves (optical element manufacturing process).

In accordance with an embodiment of the present invention, an inspection groove or inspection grooves are formed in advance (inspection groove forming step) on the surface of the base member, which constitutes the molding die for the optical element, by using the cutting tool similarly. Then, the inclination or the inclinations of the cut surfaces of the inspection grooves, which is constituted, for example, of a recessed part and a protruded part, is inspected (inspection step). On the basis of the inspection result, the angle defined by the base member and the axial line of the cutting tool is corrected (correction step). After that, final and formal prescribed grooves are formed on the surface of the base member by using the cutting tool at the same time that the inspection groove is cut out (finishing step). Then, the optical element is manufactured by using the molding die with the formal grooves manufactured as described above.

Therefore, the error caused by the configuration of the cutting tool, the mounting error of the cutting tool to the working machine, the error caused by the configuration of the base member for the molding die, and the mounting error of the base member to the working machine do not affect the inclinations of the surfaces which form the formal prescribed groove. Consequently, according to the embodiment of the present invention, the molding die provided with the grooves with a high degree of precision regarding to the configuration and the dimension can be formed by the mechanical processing at a low cost, and therefore the optical element can be molded by the molding die and manufactured with a high degree of precision.

In accordance with an embodiment of the present invention, the width dimension D of the blade tip part is preferably slightly wider than half (½) of the pitch (W1+W2) of the formal groove similarly as described above.

In accordance with an embodiment of the present invention, the angles (corner angle), which are defined by the edge line extended along the widthwise direction at the lower end edge of the blade tip part and the side faces of the blade tip part, may be substantially equal to each other and may be set between 90°(included) and 120°(included). According to the cutting tool formed as described above, the groove on the molding die is formed in such a manner that the area at the opening part of the recessed part of the groove is formed larger than the bottom part of the recessed part and thus molded products are smoothly disengaged from the molding die and high productivity can be achieved.

Preferably, in accordance with an embodiment of the present invention, the angle that is defined by the base member and the edge line of the blade tip part of the cutting tool is corrected to be 0±0.02° or less with respect to a prescribed designed angle for the groove in the correction step. According to the optical element manufactured by the method described above, the deviation of the balance of the diffracted light beams with a first or more order can be suppressed, for example, within ±3%.

Other features and advantages of the invention will be apparent from the following detailed description, taken in conjunction with the accompanying drawings that illustrate, by way of example, various features of embodiments of the invention.

DETAILED DESCRIPTION OF THE PREFERRED EMBODIMENTS

A manufacturing method for an optical element such as a diffraction element in accordance with an embodiment of the present invention will be described in detail below with reference to the accompanying drawings.

First Embodiment

Figure 1:
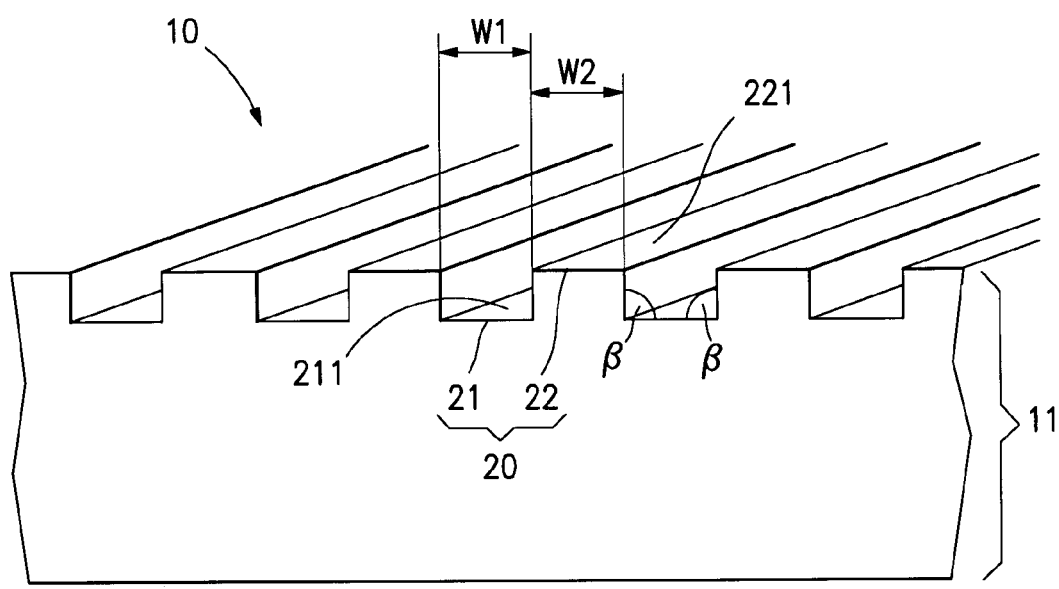
FIG. 1 is an explanatory perspective view showing a groove configuration of a diffraction element as an optical element according to an embodiment of the present invention.
Figure 2A:
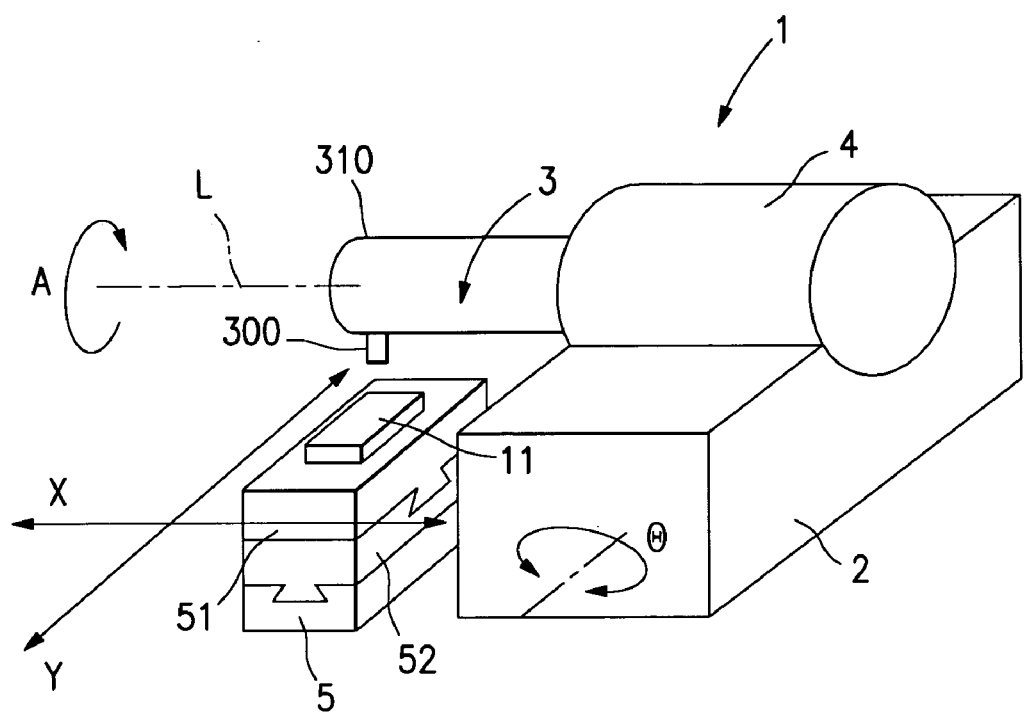
FIG. 2(A) is an explanatory perspective view of a fine working machine used for manufacturing the diffraction element shown in FIG. 1.
Figure 2B:
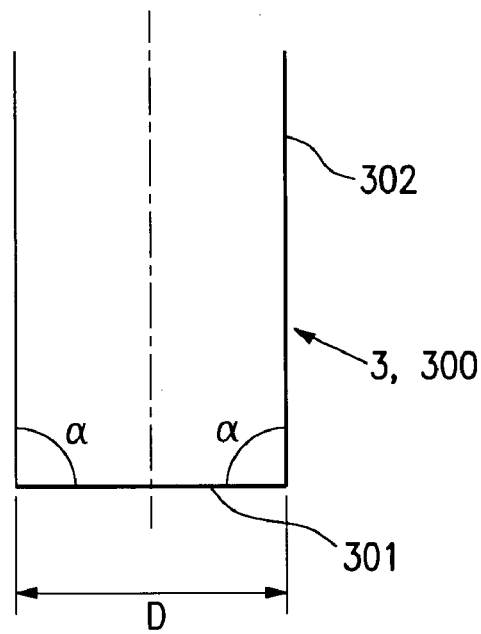
FIG. 2(B) is a front view of the blade tip part of a cutting tool and FIG. 2(C) is a side view of the blade tip part of the cutting tool.
Figure 2C:
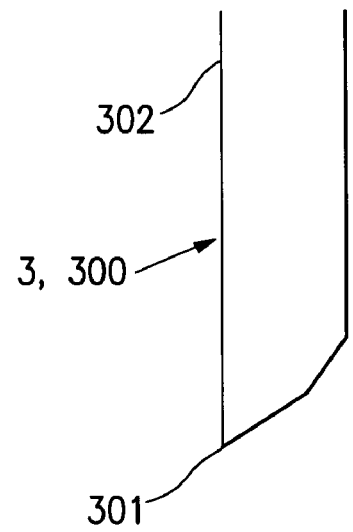
Figure 3:
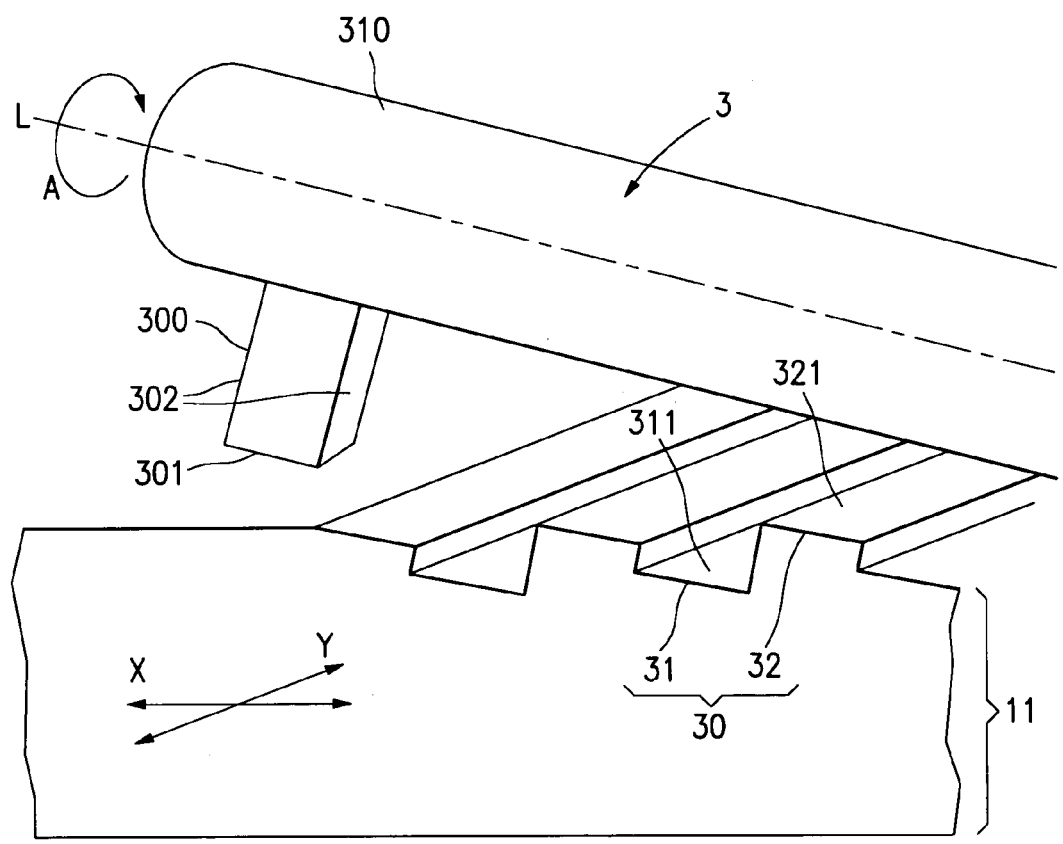
FIG. 3 is an explanatory perspective view showing an inspection groove forming step of the manufacturing steps for the optical element according to the embodiment of the present invention.
Figure 4:
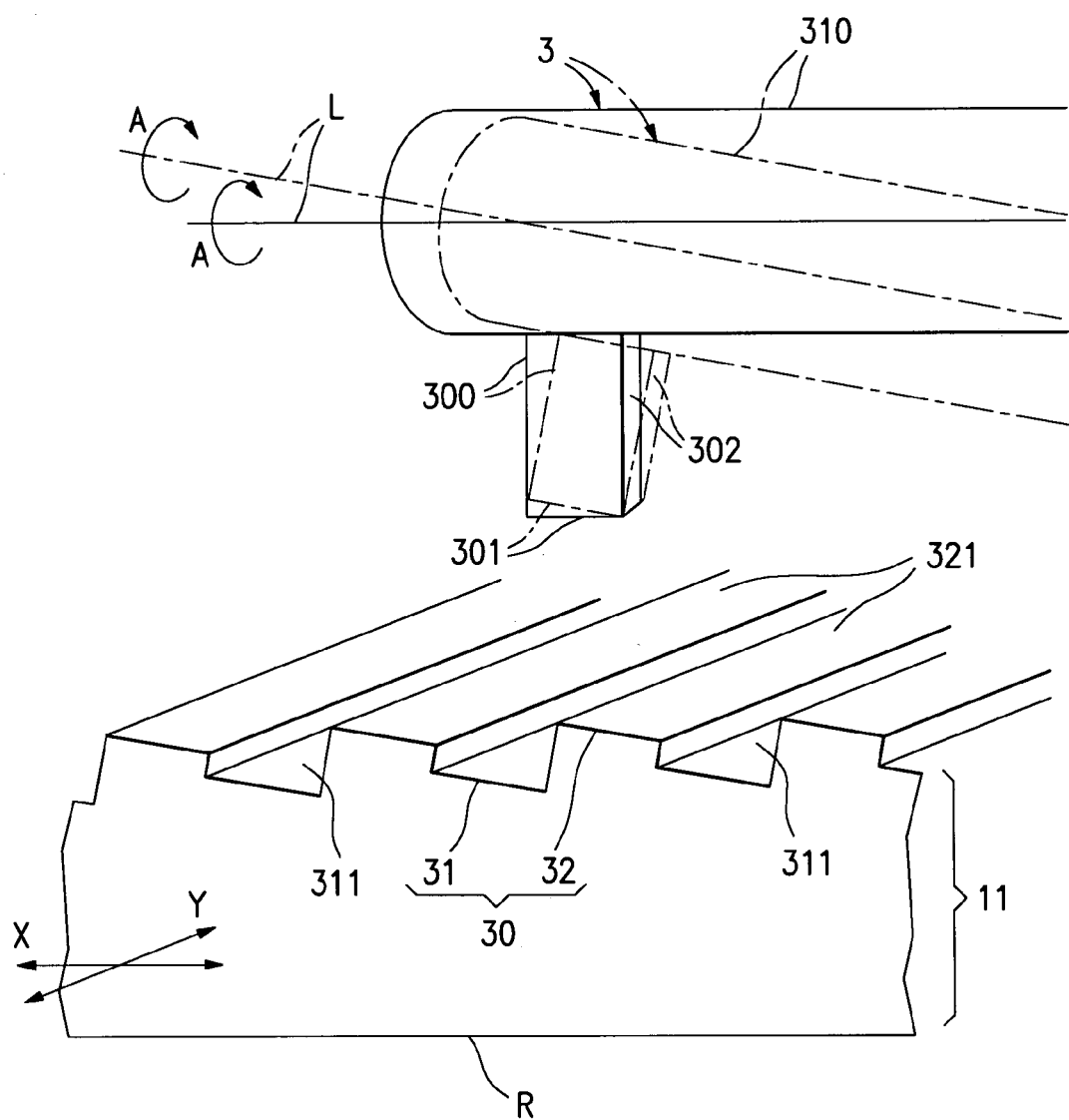
FIG. 4 is an explanatory perspective view showing a correction step of the manufacturing steps for the optical element according to the embodiment of the present invention.
Figure 5:
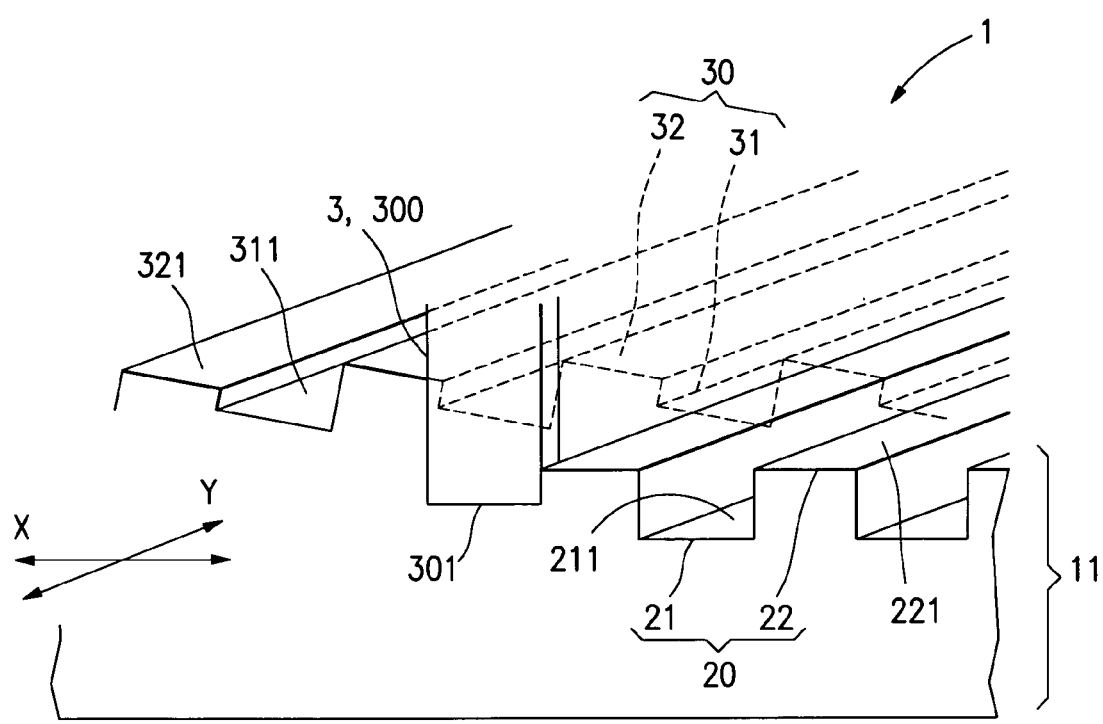
FIG. 5 is an explanatory perspective view showing a finishing step of the manufacturing steps for the optical element according to the embodiment of the present invention.

FIG. 1 is an explanatory perspective view showing a groove configuration of a diffraction element as an optical element according to an embodiment of the present invention. FIG. 2(A) is an explanatory perspective view of a fine working machine used for manufacturing the diffraction element shown in FIG. 1. FIGS. 2(B) and 2(C) are a front view and a side view of the blade tip part of a cutting tool. FIG. 3 is a perspective view showing an inspection groove forming step, FIG. 4 is a perspective view showing a correction step and FIG. 5 is a perspective view showing a finishing step of the manufacturing steps for the optical element.

In an optical head device for recording onto or reproducing from a CD, a CD-R, or a DVD, a diffraction element 10 is used on which a row of grooves 20 are formed on the surface of a base member 11 for an optical element with the pitch almost the same as the wavelength of a light beam as shown in FIG. 1.

A fine working machine 1 used in this embodiment to form the diffraction element 10 is provided with a spindle 4 mounted on a spindle base 2 and a stage 5 on which the base member 11 is placed as shown in FIG. 2(A). A cutting tool 3 is provided with a round bar-shaped shank 310 of the spindle 4. A blade tip part 300 of the cutting tool 3 is protruded so as to be perpendicular to the axial line L of the cutting tool 3, i.e., of the shank 310 of the cutting tool 3 toward the outside of the shank 310.

The spindle base 2 is constituted in such a manner that the angle of the spindle base 2 is adjustable in a direction as shown by the arrow θ. Therefore, by adjusting the angle of the spindle base 2 in the direction shown by the arrow θ, the inclination of the rotational axis line L of the cutting tool 3, i.e., the inclination of the edge line along the widthwise direction of the blade tip part 300 can be adjusted.

Alternatively, instead of constituting the spindle base 2 such that it is capable of being angularly adjusted in the direction shown by the arrow θ, the spindle 4 may be mounted on the spindle base 2 or the shank 310 may be mounted to the spindle 4 so as to be angularly adjusted in the same direction as shown by the arrow θ. Also, instead of adjusting the spindle base 2, the stage 5 for positioning the base member 11 for the optical element may be angularly adjusted in the same direction as shown by the arrow θ.

The stage 5 includes an X-direction slide block 51 for sliding the base member 11 in the direction as shown by the arrow X and a Y-direction slide block 52 for sliding the X-direction slide block 51 in the direction as shown by the arrow Y. Therefore, the base member 11 is movable in both the X-direction and the Y-direction.

The blade tip part 300 of the cutting tool 3 is provided with a cutting part made of a single crystal diamond and having a flat edge line 301 at the lower end part as shown in FIGS. 2(B) and 2(C). The width dimension D of the cutting part is set to be equal to the width dimension W1 of the recessed part 21 and slightly wider than the width dimension W2 of the protruded part 22, which form the grooves of the diffracting element 10 as shown in FIG. 1. Therefore, the width dimension W2 of the protruded part 22 is set to be slightly narrower than the width dimension W1 of the recessed part 21. In other words, the relationship between the width of the recessed part 21 and the width of the protruded part 22 is determined with the reference to the pitch of the groove ((width dimension W1 of the recessed part 21)+(width dimension W2 of the protruded part 22)) as described above. Also, in the blade tip part 300 of the cutting tool 3, both corner angles 'a' which are formed by the edge line 301 and the side face 302 are respectively set to be 90°.

A manufacturing method for the diffraction element 10 shown in FIG. 1 by using the above-mentioned fine working machine 1 will be described below. First, as shown in FIG. 3, an inspection groove forming step is performed. In the inspection groove forming step, the cutting tool 3 is relatively moved on the surface of the base member 11 along an extending direction of the groove (Y-direction) while the cutting tool 3 is rotated at a high speed around the axial line L shown by the alternate long and short dash line. Therefore, an inspection groove 30 is formed on the surface of the base member 11 by rotating the blade tip part of the cutting tool 3 similarly as the case when the formal groove is formed.

The inspection groove 30 may be constituted with only one recessed part 31, but a plurality of inspection grooves 30 are preferably formed to obtain the average value of the inclinations of the plural recessed parts 31. Therefore, the recessed parts 31 can be formed as the inspection grooves 30 by means of relatively moving the cutting tool 3 and the base member 11 in the Y-direction whenever the cutting tool 3 is relatively shifted by a prescribed dimension in the X-direction, for example, the width dimension W1 of the recessed part 31 or the width dimension W2 of the protruded part 32.

In the case that both the recessed part 31 and the protruded part 32 are constituted as the inspection groove 30, it is preferable to shift the cutting tool 3 relatively by half ((W1+W2)/2) of the pitch in the X-direction where one interval (W1+W2) of the recessed part having the width dimension W1 and the protruded part having the width dimension W2 is one pitch of the groove 30. Therefore, after the recessed part 31 is formed, the cutting tool 3 is relatively shifted with respect to the base member 11 by half ((W1+W2)/2) of the pitch in the X-direction and then the protruded part 32 is machined. Next, the cutting tool 3 is shifted again by half ((W1+W2)/2) of the pitch in the X-direction and the next recessed part 31 is machined. And then, the cutting tool 3 is shifted again by half ((W1+W2)/2) of the pitch in the X-direction and the next protruded part 32 is machined. Further, these operations are successively repeated, and then the recessed part 31 and the protruded part 32 are formed as the inspection grooves 30. Alternatively, the inspection groove 30 formed of only one pair of the recessed part 31 and the protruded part 32 may be applicable.

Concretely, in order to form the inspection groove 30, while the cutting tool 3 is rotated at a high speed around the rotational axis line L as shown by the arrow A, the cutting tool 3 is moved downward to a position which is determined such that the edge line 301 of the blade tip part 300 is capable of forming the bottom surface of the recessed part 31. Then the cutting tool 3 is relatively moved with respect to the base member 11 in the Y-direction to form the recessed part 31 of the inspection groove 30. Afterwards, the cutting tool 3 is relatively shifted to the base member 11 by half ((W1+W2)/2) of the pitch in the X-direction. After that, the cutting tool 3 cuts the upper face to form the protruded part 32 of the inspection groove 30 by positioning the edge line 301 of the blade tip part 300 of the cutting tool 3 a little lower than the surface of the base member 11.

Next, an inspection step is performed. In the inspection step, as shown in FIG. 4, the inclination of the bottom face 311 of the recessed part 31 and/or the inclination of the upper face 321 of the protruded part 32 which constitutes the inspection groove 30 are inspected. When the inspection groove 30 is formed of only one recessed part 31, only the inclination of the bottom face 311 of the recessed part 31 is inspected. In the case that the recessed part 31 and the protruded part 32 are alternately and repeatedly constituted as the inspection grooves 30, an average of the inclinations based on an appropriate combination may be preferably obtained.

Next, a correction step is performed. In the correction step, on the basis of the inspection results obtained as described above, the cutting tool 3 is adjusted and corrected as shown by the solid line in such a manner that the angle between the reference surface R of the base member 11 and the rotational axis line L of the cutting tool 3, that is, the angle between the reference surface R of the base member 11 and the edge line 301 of the blade tip part 300 of the cutting tool 3, is set to be 0±0.02° or less with respect to the designed angle for the groove.

After that, a finishing step is successively performed as shown in FIG. 5 under the state that the same base member 11 with the inspection grooves on its surface is held on the stage 5 after the inspection groove forming step, the inspection step and the correction step have been completed. In other words, in the finishing step, the cutting tool 3 is relatively moved on the surface of the base member 11, which has been worked on both by the inspection groove forming step and the correction step, along the extending direction of the groove (Y-direction) and the width direction of the groove (X-direction) while the cutting tool 3 is rotated at a high speed around the axial line L. Therefore, the surface of the base member 11, on which the inspection grooves 30 are already formed, is cut again by the blade tip part 300 of the cutting tool 3 and finally required formal grooves 20 are formed.

In other words, while the cutting tool 3 is rotated at a high speed around the axial line L, the cutting tool 3 is moved downward to a position where the edge line 301 of the blade tip part 300 is required to form the bottom face 211 of the formal recessed part 21. Then the cutting tool 3 is relatively moved with respect to the base member 11 in the Y-direction to form the recessed part 21 of the final formal groove 20. After the formal recessed part 21 is formed, the cutting tool 3 is shifted relatively by half ((W1+W2)/2) of the pitch of the final formal groove 20 in the X-direction where one interval (W1+W2) of the recessed part having the width dimension W1 and the protruded part having the width dimension W2 is one pitch of the final formal groove 20, and then the protruded part 22 is machined by the cutting tool 3 to form the upper face 221 of the base member 11.

As described above, the width dimension D of the blade tip part 300 of the cutting tool 3 is set to be equal to the width dimension W1 of the recessed part 21 and slightly wider than the width dimension W2 of the protruded part 22, which form the final formal grooves of the diffracting element 10 shown in FIG. 1. Therefore, the width dimension W2 of the protruded part 22 is set to be slightly narrower than the width dimension W1 of the recessed part 21. As a result, when the cutting tool 3 is shifted by half ((W1+W2)/2) of the pitch in the X-direction after the recessed part 21 is formed and the protruded part 22 is machined, the blade tip part 300 of the cutting tool 3 cuts the protruded part 22 so as to cover the boundary portion (edge) of the recessed part 21 and the protruded part 22. Thus, the boundary portion (edge) between the recessed part 21 and the protruded part 22 can be formed properly and the protruded part 22 can be formed by machining only once with a high degree of precision.

Next, the cutting tool 3 is shifted again by half ((W1+W2)/2) of the pitch in the X-direction and the next recessed part 21 is machined. As described above, when the cutting tool 3 is shifted by half ((W1+W2)/2) of the pitch in the X-direction and the recessed part 21 is machined, the blade tip part 300 of the cutting tool 3 cuts the recessed part 21 so as to include the portion where the cutting tool 3 has already cut as the protruded part 22. Therefore, the boundary portion (edge) between the protruded part 22 and the recessed part 21 can be also formed properly and the protruded part 22 is formed by machining only once with a high degree of precision.

In addition, after the recessed part 21 is formed, the cutting tool 3 is shifted again by half ((W1+W2)/2) of the pitch in the X-direction and the protruded part 22 is machined. These procedures are performed repeatedly to form the row of formal grooves 20 constituted of the recessed part 21 having the width dimension W1 and the protruded part 22 having the width dimension W2 alternately.

As a result, all the recessed parts 31 and the protruded parts 32 which constitute the inspection grooves 30 are completely cut out from the surface of the base member 11, and a new row of formal grooves 20 are formed on the surface of the base member 11 as shown in FIG. 1. Then, the base member 11 is cut at a prescribed dimension and a desired diffraction element 10 is obtained.

As described above, the row of the grooves 20 formed on the surface of the diffraction element 10 are formed so as to have the width dimension W1 for the recessed part 21 and the width dimension W2 (W2<W1) for the protruded part 22 by the width dimension D of the cutting tool 3. Also, the corner angle "β" of the recessed part 21 constituting the groove 20 is defined at an angle of 90° that is equal to the corner angle "α" between the edge line 301 and the side face 302 of the cutting tool 3.

According to the manufacturing method for the diffraction element 10 in this embodiment of the present invention, the inclination of the bottom face 311 of the recessed part 31 and the inclination of the upper face 321 of the protruded part 32, which form the inspection groove 30, are inspected and then, on the basis of the inspection results, the angle defined by the base member 11 and the edge line 301 of the blade tip part 300 of the cutting tool 3 is corrected. After that, the grooves 20 are formed in such a manner that the surface including the inspection groove 30 of the base member 11 is cut again by the blade tip part 300 of the cutting tool 3. Therefore, the error due to the configuration of the cutting tool 3, the error due to attaching the cutting tool 3 to the working machine, the error due to the configuration of the base member 11, and the error due to attaching the base member 11 to the working machine do not cause the errors relating to the inclination of the bottom face 211 of the recessed part 21 and the inclination of the upper face 221 of the protruded part 22.

Accordingly, the precisions of the inclination of the bottom face 211 of the recessed part 21 and the inclination of the upper face 221 of the protruded part 22 are extremely high such as ±0.02°. Consequently, according to the embodiment of the present invention, the diffraction element 10 provided with the grooves 20 having a high degree of precision relating to the configuration and the dimension can be formed by the mechanical processing at a low cost. Further, according to the diffraction element 10 manufactured by the method of the embodiment of the present invention, the precision of the configuration and the dimension of the groove 20 is extremely high, and thus the deviation of the balance of the diffracted light beams with a first or more order, for example, the deviation of the balance of the (+) first-order diffracted light beam and the (−) first-order diffracted light beam, can be suppressed within ±3%. Therefore, an excellent balance of the diffraction efficiency and the maximum transmitting efficiency are achieved.

According to the embodiment of the present invention described above, the row of the grooves 20 are formed by means of the cutting tool 3 having the width dimension D, which is equal to the width dimension W1 of the recessed part 21 and slightly wider than the width dimension W2 of the protruded part 22. In other words, the width dimension D of the blade tip part 300 is slightly wider than half (½) of the pitch (W1+W2) of the groove. Therefore, when the protruded part 22 is formed, the cutting tool 3 is required to move in the X-direction only once. Consequently, according to the embodiment of the present invention, successive grooves 20 of the diffraction element 10 are efficiently formed.

On the contrary, if the width dimension D of the blade tip part 300 is formed narrower than half (½) of the pitch (W1+W2) of the groove, at least one of the recessed part 21 and the protruded part 22 is required to cut the base member a plurality of times when a rectangular diffraction grating is formed. For example, the width dimension D of the cutting tool 3 is set to be smaller than both the width dimension W1 of the recessed part 21 and the width dimension W2 of the protruded part 22, the cutting tool 3 is required to shift a plurality of times in the X-direction to form both the protruded part 22 and the recessed part 21. Therefore, a cutting time becomes longer and the service life of the blade tip part is reduced.

According to the embodiment of the present invention described above, the angles (corner angle "α"), which are defined by the edge line 301 extended along the widthwise direction at the lower end edge of the blade tip part 300 and the side faces 302 of the blade tip part 300, may be substantially equal to each other and may be set within the range between 90° (included) and 120° (included).

Second Embodiment

The above-mentioned first embodiment discloses the manufacturing method for the diffraction element 10 on which the fine grooves 20 are formed by performing the mechanical processing to the base member 11 for the optical element. However, the manufacturing method of the present invention may be applied to a second embodiment that the fine grooves are formed on a base member for a molding die which is used to produce the optical element. The recessed parts and the protruded parts of the fine grooves formed on the molding die are transferred to an optical material to produce the diffraction element 10.

A concrete manufacturing method in this second embodiment is similar to the first embodiment described above, and thus the detailed description is omitted. According to the second embodiment of the present invention, as similar to the first embodiment, in the inspection groove forming step, the cutting tool 3 is relatively moved on the surface of the base member of the molding die along an extending direction of the groove (Y-direction) while the cutting tool 3 is rotated at a high speed around the axial line L to form inspection grooves on the surface of the base member by the blade tip part of the cutting tool 3. The inspection grooves 30 are formed by relatively moving the cutting tool 3 and the base member in the Y-direction whenever the cutting tool 3 is shifted by a predetermined dimension in the X-direction. Then, an inspection step is performed and the inclination of the bottom face 311 of the recessed part 31 and the inclination of the upper face 321 of the protruded part 32 are inspected. After the inspection step, based on the inspection results, a correction step is performed and the angle of the edge line 301 of the blade tip part 300 of the cutting tool 3 is adjusted to the reference surface "R" of the base member. Then, a finishing step is successively performed and the cutting tool 3 is relatively moved on the surface of the base member along the extending direction of the groove (Y-direction) and the width direction of the groove (X-direction) while the cutting tool 3 is rotated at a high speed around the axial line L. Therefore, the surface of the base member, on which the inspection grooves 30 are formed, is cut again by the blade tip part 300 of the cutting tool 3 and the final formal grooves are formed on the molding die.

According to the second embodiment of the present invention, the molding die for the diffraction element 10 provided with the grooves 20 can be formed by the mechanical processing at a low cost with a high degree of precision relating to the configuration and the dimension of the grooves. Therefore, an optical element such as the diffraction element 10 provided with the grooves 20 can be formed by using the molding die manufactured as described above.

In the second embodiment of the present invention, the angles (corner angle "α"), which are defined by the edge line 301 of the blade tip part 300 and the side faces 302 of the blade tip part 300, may be substantially equal to each other and may be preferably set within the range between 90° and 120°. According to the molding die described above, the area at an opening part of the recessed part of the groove is formed larger than the bottom part of the recessed part, and thus molded products are smoothly disengaged from the molding die and high productivity can be achieved.

Also in the second embodiment, it is preferable that the width dimension D of the blade tip part 300 is slightly wider than half (½) of the pitch (W1+W2) of the groove. In the case that the width dimension D of the blade tip part 300 is slightly wider than half (½) of the pitch (W1+W2) of the groove, both the recessed part and the protruded part can be formed by moving the cutting tool 3 in the X-direction only once.

In the embodiment of the present invention described above, the deviation of the angle defined by the edge line 301 formed at the lower end of the blade tip part 300 along the widthwise direction and the base member of the molding die is preferably set to be 0.02° or less with respect to the designed reference angle of the respective grooves. As a result, the deviation of the balance of the diffracted light beams can be suppressed, for example, to less than 3%.

Other Embodiments

In the embodiments described above, the present invention is applied to the diffraction grating provided with a row of grooves 20 whose cross-section is in a rectangular shape or in a nearly rectangular shape. However, the present invention may be applied to manufacture a stair-like diffraction grating such as a binary blazed diffraction grating. Further, the manufacturing method according to the present invention may be applied to manufacture an optical element other than the diffraction grating which is provided with fine grooves on its surface.

In the correction step according to the embodiments of the present invention described above, the angle defined by the base member 11 and the edge line 301 of the blade tip part 300 of the cutting tool 3 is corrected so as to be within 0±0.02° with respect to the designed and predetermined angle of the grooves. Alternatively, when the desired shape of the groove is in a 'V' concaved shape, the edge line 301 of the blade tip part 300 of the cutting tool 3 is corrected so as to be within 0±0.02° with respect to the prescribed angle which is inclined to the horizontal line. In this case, a plurality of 'V'-shaped grooves can be formed by the corner edge portion of the cutting tool 3.

Further, the present invention may be applied to manufacture a V-groove shaped grating by using a rotating cutting tool provided with a V-shaped blade tip part. The grooves having such a configuration are difficult to be formed by semiconductor processes. However, according to the manufacturing method of the present invention, the V-shaped grooves are easily and precisely manufactured. In this case, the attitude of the cutting tool is preferably corrected such that both the inclinations of the right and left cutting surfaces for forming the V-groove are equal to each other. Furthermore, the present invention may be applied to manufacture an optical lens provided with a diffraction grating.

As described above, according to the present invention, an inspection groove is formed in advance on the surface of the base member by the cutting tool by means of relatively moving the cutting tool and the base member. Then, the inclination of the cut surface of the inspection groove is inspected and, on the basis of the inspection result, the angle defined by the base member and the cutting tool is corrected. After that, formal prescribed grooves are formed on the surface of the base member having the inspection groove by using the cutting tool at the same time that the inspection groove is cut out. Therefore, the error caused by the configuration of the cutting tool, the mounting error of the cutting tool to the working machine, the error caused by the configuration of the base member, and the mounting error of the base member to the working machine do not affect the inclinations of the faces which form the formal prescribed grooves. Consequently, according to the embodiment of the present invention, the optical element provided with the grooves having a high degree of precision relating to the configuration and the dimension can be formed by the mechanical processing at a low cost.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A manufacturing method for an optical element comprising:
   providing a base member for an optical element and a cutting tool from which a blade tip part protrudes;
   forming an inspecting groove on a surface of the base member by the blade tip part of the cutting tool by relatively moving the cutting tool and the base member while the cutting tool is rotated;
   inspecting an inclination of a cut surface of the inspection groove formed by the cutting tool to form an inspection result;
   correcting an angle defined by the base member and the blade tip part of the cutting tool based on the inspection result; and
   forming formal grooves on the surface of the base member having the inspection groove by the blade tip part of the cutting tool by relatively moving the cutting tool and the base member while the cutting tool is rotated simultaneously with the inspection groove being cut out.

2. The manufacturing method for an optical element according to claim 1, further comprising:
   providing the inspection groove with a recessed part and a protruded part formed by the cutting tool; and
   simultaneously cutting out the inspection groove when the formal grooves which have a recessed part and a protruded part are formed.

3. The manufacturing method for an optical element according to claim 2, further comprising mounting the cutting tool to adjust an inclination of a rotational axis line of the cutting tool such that the angle defined by the base member and the blade tip part of the cutting tool is corrected by adjusting the inclination of the rotational axis line of the cutting tool.

4. The manufacturing method for an optical element according to claim 1, further comprising providing one interval (W1+W2) of the recessed part having a width dimension W1 and the protruded part having a width dimension W2 with one pitch of the formal grooves, and a width dimension D of the blade tip part slightly wider than half (½) of a pitch (W1+W2) of the formal grooves.

5. The manufacturing method for an optical element according to claim 4, further comprising:
   setting the width dimension D of the blade tip part equal to the width dimension W1 of the recessed part and slightly wider than the width dimension W2 of the protruded part; and
   repeatedly shifting the cutting tool by half ((W1+W2)/2) of the pitch in a widthwise direction of the inspection groove to form the formal grooves constituted of the recessed part having the width dimension W1 and the protruded part having the width dimension W2 alternately.

6. The manufacturing method for an optical element according to claim 1, further comprising providing angles which are defined by an edge line extended along a widthwise direction at a lower end edge of the blade tip part and side faces of the blade tip part, substantially equal to each other and set between 90° and 120°.

7. The manufacturing method for an optical element according to claim 1, further comprising correcting an angle defined by the base member and an edge line of the blade tip part of the cutting tool to be 0±0.02° or less with respect to a prescribed designed angle for the inspection groove.

8. A manufacturing method for an optical element comprising:
   providing a base member for a molding die for an optical element and a cutting tool from which a blade tip part protrudes;
   forming an inspection groove on a surface of the base member by the blade tip part of the cutting tool by relatively moving the cutting tool and the base member while the cutting tool is rotated;
   inspecting an inclination of a cut surface of the inspection groove formed by the cutting tool to form an inspection result;

correcting an angle defined by the base member and the blade tip part of the cutting tool based on the inspection result;

forming formal grooves on the surface of the base member having the inspection groove by the blade tip part of the cutting tool by relatively moving the cutting tool and the base member while the cutting tool is rotated simultaneously with the inspection groove being cut out; and manufacturing the optical element formed in a recessed-and-protruded shape using the molding die with the formal grooves.

9. The manufacturing method for an optical element according to claim 8, further comprising:

providing the inspection groove with a recessed part and a protruded part formed by the cutting tool; and cutting out the inspection groove simultaneously when the formal grooves which have a recessed part and a protruded part are formed.

10. The manufacturing method for an optical element according to claim 9, further comprising mounting the cutting tool to adjust an inclination of a rotational axis line of the cutting tool such that the angle defined by the base member and the blade tip part of the cutting tool is corrected by adjusting the inclination of the rotational axis line of the cutting tool.

11. The manufacturing method for an optical element according to claim 8, further comprising providing one interval (W1+W2) of the recessed part having a width dimension W1 and the protruded part having a width dimension W2 with one pitch of the formal grooves, and a width dimension D of the blade tip part slightly wider than half (½) of a pitch (W1+W2) of the formal grooves.

12. The manufacturing method for an optical element according to claim 11, further comprising:

setting the width dimension D equal to the width dimension W1 and slightly wider than the width dimension W2; and repeatedly shifting the cutting tool by half ((W1+W2)/2) of the pitch in a widthwise direction of the inspection groove to form the formal grooves constituted of the recessed part having the width dimension W1 and the protruded part having the width dimension W2 alternately.

13. The manufacturing method for an optical element according to claim 8, further comprising providing angles which are defined by an edge line extended along a widthwise direction at a lower end edge of the blade tip part and side faces of the blade tip part, substantially equal to each other and set between 90° and 120°.

14. The manufacturing method for an optical element according to claim 8, further comprising correcting an angle defined by the base member and an edge line of the blade tip part of the cutting tool to be 0±0.02° or less with respect to a prescribed designed angle for the inspection groove.

* * * * *